Dec. 19, 1961 W. D. BARTLEY 3,014,090

PICTURE RECORDING APPARATUS

Filed March 3, 1959

2 Sheets-Sheet 1

INVENTOR.
WAYNE D. BARTLEY
BY Louis J. Ketterle
ATTORNEY.

Dec. 19, 1961 W. D. BARTLEY 3,014,090

PICTURE RECORDING APPARATUS

Filed March 3, 1959

2 Sheets-Sheet 2

INVENTOR.
WAYNE D. BARTLEY.
BY Louis J. Letterle
ATTORNEY.

United States Patent Office 3,014,090

Patented Dec. 19, 1961

3,014,090
PICTURE RECORDING APPARATUS

Wayne D. Bartley, R.D. 6, Penn Township, Butler County, Pa.

Filed Mar. 3, 1959, Ser. No. 796,953
3 Claims. (Cl. 178—7.4)

This invention relates to a picture recording apparatus and it has particular relation to a method and means for recording television pictures occurring at a certain frame frequency on moving picture film, which is being moved at a different frame frequency.

The primary object of the invention is the provision of a method and apparatus for picture recording of television scenes in which the scenes are photographed on continuously moving motion picture film.

Another object of the invention is to provide an apparatus which begins and terminates the exposure of a film frame in synchronism with the beginning and termination of a television frame, so as to eliminate the splice from the recorded picture.

A further object of the invention is the provision of a method of and an apparatus for recording at one frame frequency, such as 24 per second, picture which are being produced at a different frame frequency, such as 30 per second.

Still another object of the invention is to provide a method of and means for recording television pictures at their own frame rate. These and other objects of the invention will be apparent from the following description and drawings.

In the television industry, it is desirable to make a moving picture of studio scenes which are being transmitted from a television transmitter, because the pictures so taken may be used for the purpose of record and may also be projected by a standard motion picture projector. The camera employed for this purpose of recording, normally advances the films at a frequency of 24 motion picture frames per second. The obvious way of doing this is to photograph the scenes directly, but such procedure is unsuccessful since the recording camera cannot be located in the same place as the television camera and as a practical matter cannot be used for scenes during the television transmission. In addition, such method of recording is expensive, whereas the method set forth in my invention is relatively inexpensive.

As stated above, to have the pictures recorded at the standard frame frequency, 24 per second, so they may be projected later in a standard projector is the preferred embodiment of the invention, with the television pictures being transmitted at a frequency equal to or which is a submultiple of the power line frequency. In the United States, the standard power line frequency is 60 cycles per second and accordingly it is the preferred television practice to transmit pictures having a frame frequency of 30 per second. Preferably, double interlaced scanning is employed, whereby the field frequency of vertical deflection of the scanning beam is double the frame frequency, for example 60 per second. With the interlaced scanning, vertical spacing of the sweeps of the scanning beam is twice the line spacing, so that the entire height of the television picture is covered in a single vertical deflection cycle but with only half of the required number of lines. The scanning beam begins again and scans another series of lines displaced below the first set, by one pitch. The complete scanning of the picture is thus accomplished in two-half scanning or fields, which I shall designate as (A) and (B) half scannings or fields.

Another embodiment of the invention is the recording of pictures one film frame frequency of 30 per second. The picture transmitted may be recorded by focusing a motion picture camera on the end of a cathode ray tube, such as a monitor tube or a cathode tube of the projection type at the transmitter providing the frame frequencies of the television picture and the motion picture are actually synchronized with the scanning of the picture image.

In a picture recording device, for recording television pictures, formed in accordance with my invention, a certain number of picture fields, such as two, on one frame of a continuously driven film are photographed from the image beam from the cathode ray tube, through an optical system including a motor driven shutter.

For a better understanding of the invention reference may now be had to from the following description and the accompanying drawings, in which.

Figure 1:
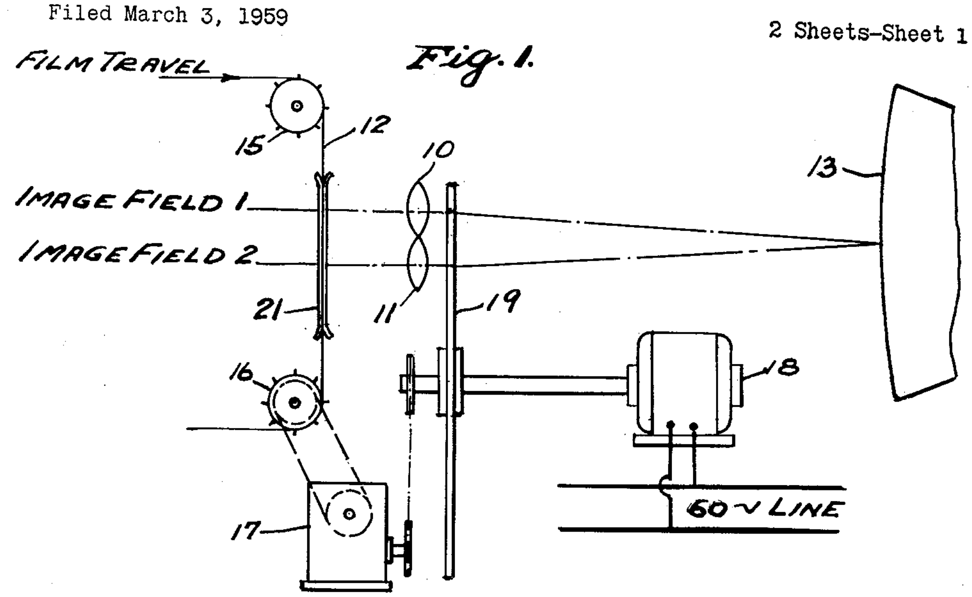
FIG. 1 is a diagrammatic view, illustrating one embodiment of the invention.

Referring now to the drawings, FIGS. 1 to 4, a camera optical system having a pair of lens 10 and 11 is provided for forming an image of a television picture upon a film 12. A cathode ray tube 13 upon the end of which there appears the television picture which is recorded on the film 12. The film 12 is trained over sprockets 15 and 16 and continuously driven by a suitable drive mechanism, indicated at 17 and driven by a synchronized motor 18, which also drives a shutter 19. A film gate 21 is provided between sprockets 15 and 16.

Figures 2, 3:
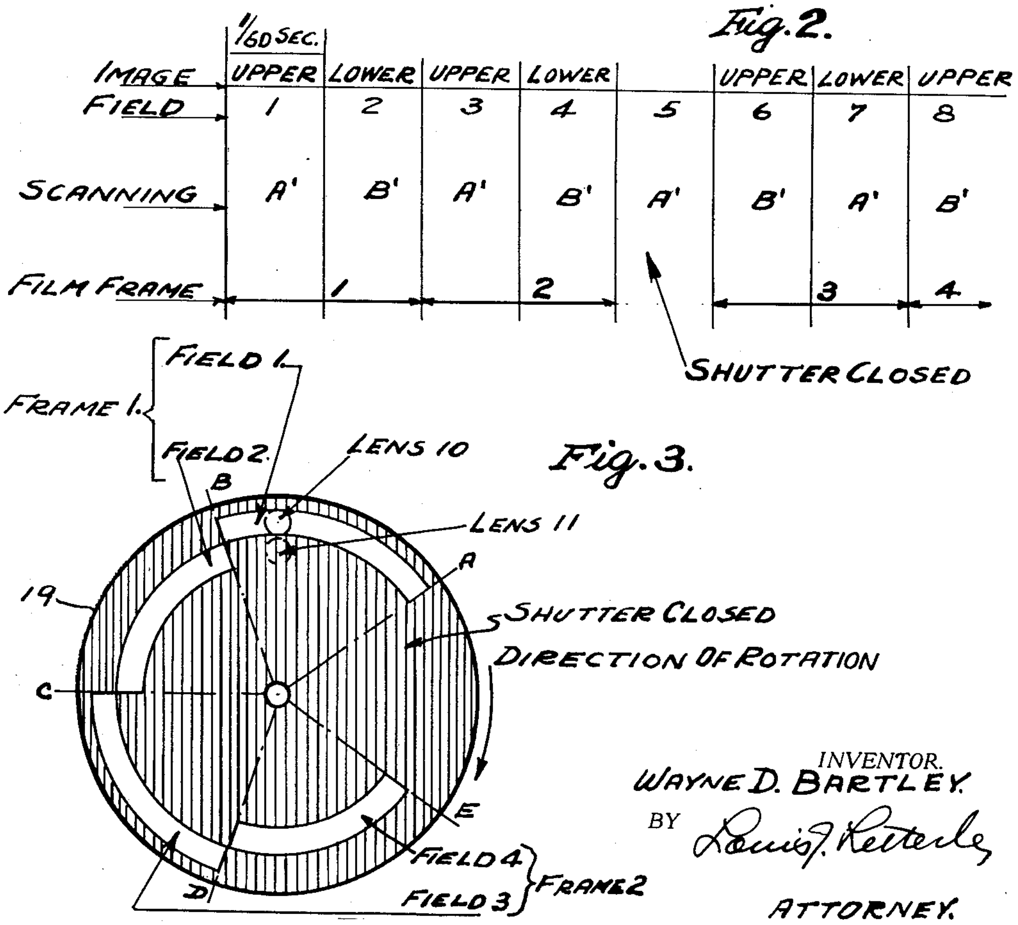
FIG. 2 is a diagram illustrating the time relations employed in practicing a specific embodiment of the invention.
FIG. 3 is a view, on a larger scale, of a shutter embodied in the apparatus shown in FIG. 1.

The television picture displayed on the cathode tube 13 is of a specific aspect ratio, which is required for recording by this invention. The aspect ratio is determined by the relation between the television frame frequency and the film frame frequency, together with the type of correction for any lost fields in the frame frequency conversion. It can be seen that if a television picture were of the standard aspect ratio (the ratio between height and width) it would just fit a standard film frame of the same aspect ratio. As shown in FIG. 2, the time relation for one vertical scan or field is $1/60$ of a second or 72 degrees travel of the shutter 19. In this space of time, the film which is advancing continuously at the recording frequency shall have traveled a distance equal to $1/5$ frame height at 24 frames per second. The travel of the film is in a direction opposite to that of the vertical scanning, thus the movement of the film adds to the effective scanning taking place on the film.

To provide a recorded picture of the proper aspect ratio the cathode ray tube display will be reduced in height an amount, that the resulting television image vertical scan and the movement of the film shall equal the total vertical scan on the film. Thus, providing a picture having an aspect ratio of 3 to 4, for pictures recorded at 24 frames per second, for example, the display picture will need be $4/5$ normal height. With the film moving continuously, it is necessary that the cathode ray tube 13 be one of short persistance, so that no vertical smear shall be present.

The optical system is so formed that the image of the television picture is split. Identical images are formed on the film, in the absence of the shutter 19 which is employed to shift the image of one field so that it will be superimposed over the preceding field. As shown in FIG. 3, the lens 10 forms the television picture on field number one and the lens 11 forming the image on field number 2.

The shutter 19 is mounted on a shaft of the motor 18 which operates at a speed to rotate the shutter once every 1/12 second. The shutter may comprise a disc having four arcuate transparent portions indicated as field numbers 1, 2, 3, and 4, FIG. 3. The remaining portion of the disc is opaque. It is evident that as the shutter is rotated, the light to one lens is intercepted, while the light is passing through the other lens.

Figure 4:
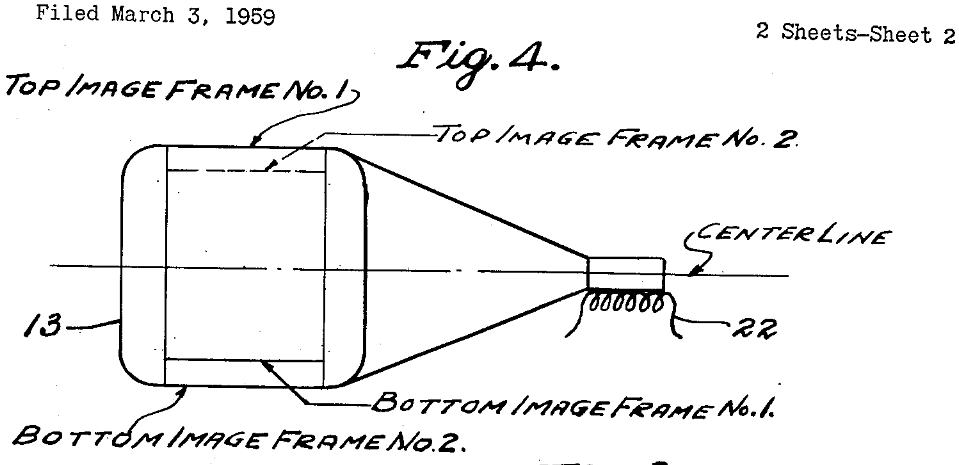
FIG. 4 is a view of a cathode tube disclosing the various position of the image on the tube for transmission.

Television pictures are normally transmitted at power line frequency of 60 cycles per second and accordingly it is the practice to transmit pictures at a frame frequency of 30 per second. Interlaced scanning is employed whereby the field frequency or frequency of vertical deflection of the scanning beam is double the frame frequency. In the use of interlaced scanning, vertical spacing of the sweeps of the scanning beam is twice the line spacing so that the entire height of the television picture is covered in a single deflection cycle, but with only half the required number of lines. The scanning beam then begins again and scans another series of lines displaced below the first set by one line pitch. The complete scanning of the picture is thereby produced in two half-scannings or fields, indicated in FIG. 2 as A′ and B′. Starting at field number 1 and at point A on the shutter 19, FIG. 3, the first field is traced on the film 12, through lens 10. Field number 1 is completed as the shutter moves to point B and the light admitting path is now through lens 11 for the exposure of field number 2. Field number 2 is superimposed over field number 1 completing the exposure of frame No. 1. This cycle is repeated for fields numbers 3 and 4 which make up frame No. 2. To compensate for the area of the shutter marked "shutter closed" so that no space is present on the film for field number 5, means for shifting the exposure of frames No. 1 and No. 2 is provided. This may be accomplished by different means but as indicated in FIG. 4, a deflection coil 22 is provided so that frame No. 2 is lower than frame No. 1 on the screen of the cathode ray tube 13 by an amount equal to 1/10 frame height on the film. That is the major portion of the image for frame No. 1 is positioned above the center of the television screen, with the major portion of the image for frame No. 2 positioned below the center of the television screen.

Figure 5:
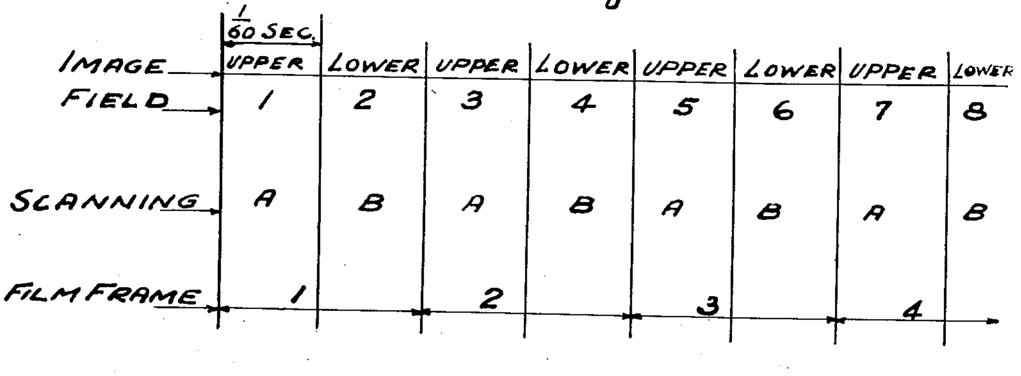
FIG. 5 is a diagram of another embodiment of the invention showing the time relation employed.
Figures 6, 7:
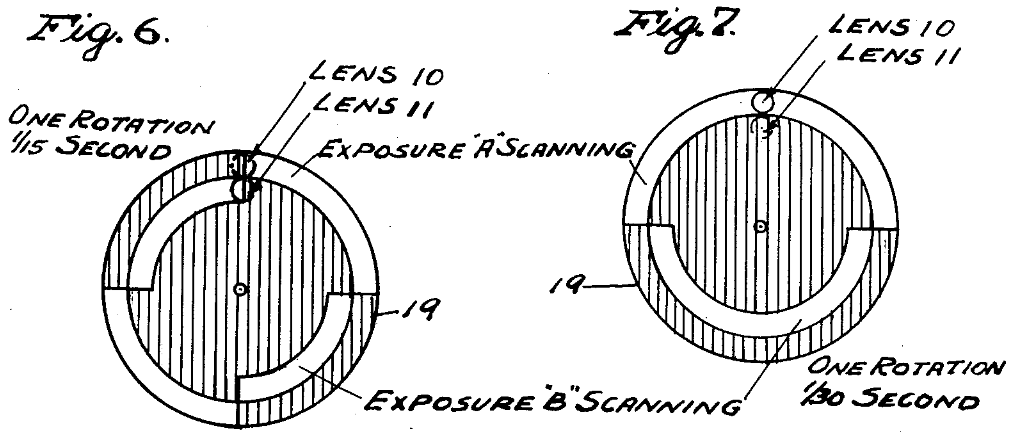
FIG. 6 is a view of a shutter employed in the embodiment of the invention shown in FIG. 5.
FIG. 7 is a view of another shutter which may be employed, in the invention.

FIGS. 5 to 7 provide for recording 30 frames per second on a film from 30 frames per second television picture. In this embodiment all of the fields are recorded. The shutter of FIG. 6 is substituted for the shutter of FIG. 3. The exposure of A scanning is photographed through lens 10 and the exposure of B scanning in each frame is photographed through lens 11. In this embodiment the space for the lost field is omitted.

From the foregoing it will be apparent that I have provided a method and apparatus for copying a frame interlaced television onto continuously driven film and that the many uses and advantages of this invention will be apparent to those familiar with the art.

What I claim:

1. An apparatus for recording television pictures occurring at a frame rate of 30 frames, of two fields each, per second onto a film being moved at a frame rate of 24 frames per second which comprises means for successively exposing one film frame of the continuously moving film, means for projecting a television picture onto said film, a rotating shutter formed with four arcuate shaped openings and a closed portion, the openings formed to permit projection of two television picture fields on each of two film frames in one revolution of the shutter and means for alternately shifting the picture for each exposed frame of the film, thereby compensating for the closed portion of the shutter.

2. An apparatus for recording television pictures occurring at a frame rate of 30 frames, of two fields each, per second onto a film being moved at a frame rate of 24 frames per second which comprises a continuously moving film, means including a drive mechanism for moving the film, means for successively exposing one film frame at a time, means for projecting an image of a picture onto said film, a continuously rotating shutter, formed of a plurality of arcuate shaped openings and a closed section, the openings formed to permit projecting two picture fields on each of two film frames with the closed section formed to prevent exposure of the picture on the film, for the period of one picture field, in one revolution of the shutter and means for alternately shifting the image of the picture for each exposed film frame with the major portion of the picture image of the first film frame above the center of the television screen and the major portion of the picture image of the second film frame below the center of the television screen to compensate for the closed section of the shutter.

3. An apparatus for recording television pictures occurring at a frame rate of 30 frames, of two fields each, per second onto a continuously moving film at a rate of 24 frames per second which comprises means for successively exposing one film frame at a time, means for projecting a television picture onto said film, a rotating shutter formed with four arcuate shaped openings and a closed portion, each of the openings of a length equal to the period of one picture field, thereby permitting projection of two television picture fields on each of two film frames in one revolution of the shutter and means for alternately shifting the image of the picture for each exposed film frame so that the major portion of the picture image of the first film frame is above the center of the television screen, with the major portion of the picture image of the second film frame below the center of the television screen to compensate for the closed portion of the shutter.

References Cited in the file of this patent

UNITED STATES PATENTS 2,622,147 Condliffe ---------------- Dec. 16, 1952

FOREIGN PATENTS 690,482 Great Britain ------------ Apr. 22, 1953